Nov. 15, 1966  R. P. BARTELL ET AL  3,285,800
CUSHIONING AND WRAPPING LAMINATE
Filed Feb. 25, 1963
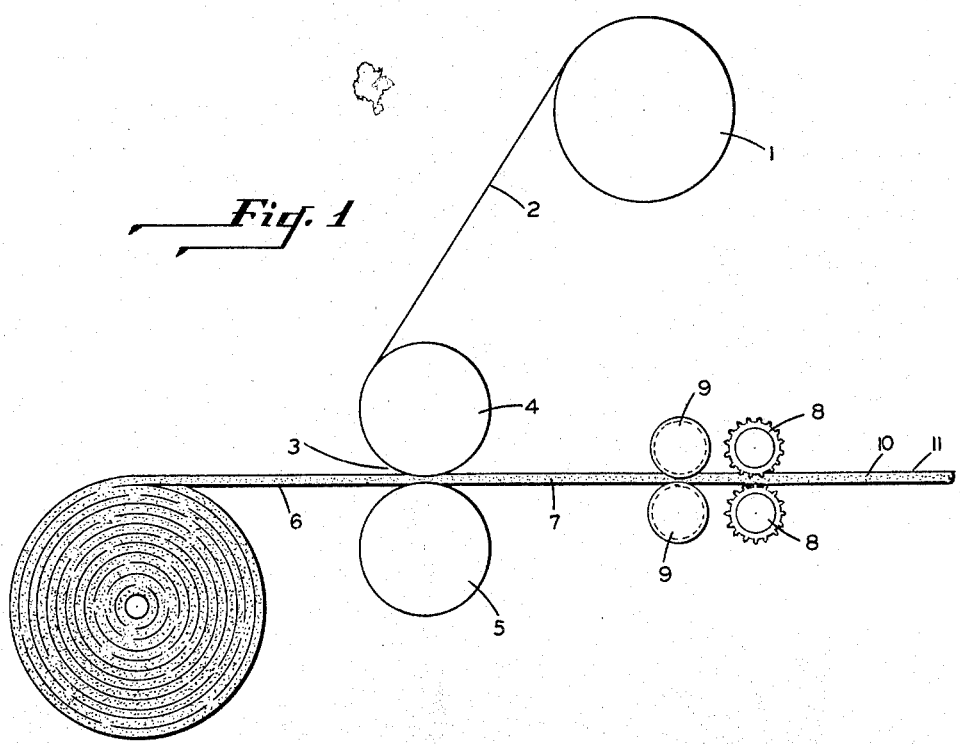
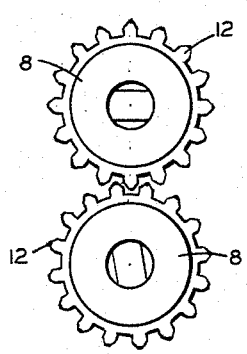
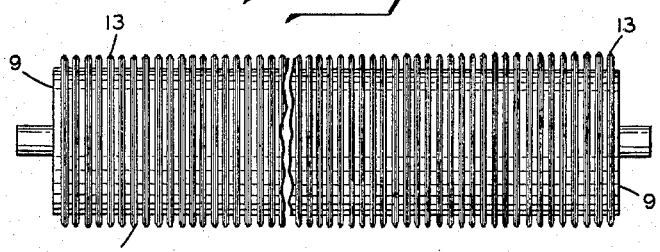
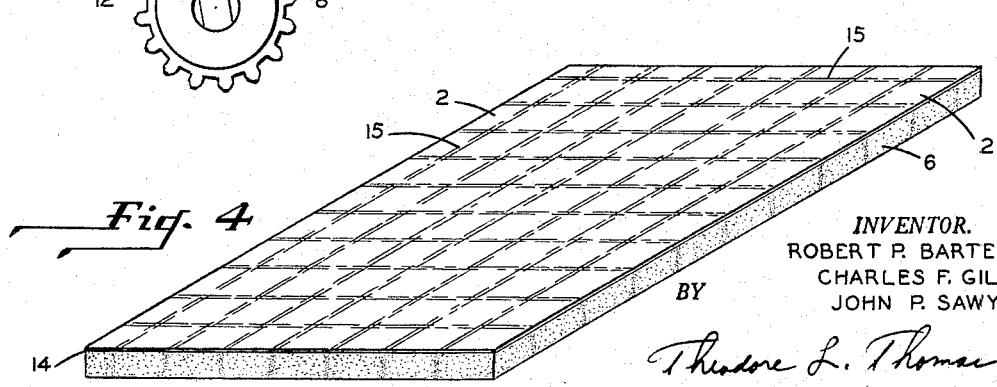
INVENTOR.
ROBERT P. BARTELL
CHARLES F. GILBO
JOHN P. SAWYER
BY Theodore L. Thomas

3,285,800
CUSHIONING AND WRAPPING LAMINATE
Robert P. Bartell, Manor Township, Lancaster County, Charles F. Gilbo, Lancaster, and John P. Sawyer, West Lampeter Township, Lancaster County, Pa., assignors to Armstrong Cork Company, Lancaster, Pa., a corporation of Pennsylvania
Filed Feb. 25, 1963, Ser. No. 260,570
4 Claims. (Cl. 161—123)

This invention relates generally to a cushioning material and more particularly to a cushioning and wrapping laminate. Still more particularly, the invention relates to a flexible cushioning and wrapping laminate which has unusually excellent properties of cushioning the shocks and jolts which occur during handling and shipping of a wide variety of breakable commodities. The invention also relates to the process of making such cushioning and wrapping laminate.

Cushioning and wrapping materials now exist on the market. Such materials often comprise a series of layers of soft cellulosic papers which are physically wrapped around the object to be protected during handling or shipment. While these wrapping materials are generally satisfactory, there is a need for a cushioning and wrapping product which occupies less volume and which, if possible, presents an even greater resistance to the breaking effects of shocks, blows, and jolts than has been heretofore possible. The product must be flexible and capable of being bent and rolled so that it may be conformed to the shape of the object to be packed.

It is the primary object of the present invention to present such a product. It is a further object of the present invention to present a process for making a cushioning and wrapping product with reduced bulk and enhanced ability to cushion shocks on fragile objects. It is still another object of the present invention to present a process of making the cushioning and wrapping product.

These objects are accomplished in a straightforward manner. The invention comprises pressing a flexible open fibrous facing sheet of a thickness in the range of 0.003–0.015 inch and a minimum bursting strength of 3 pounds per square inch against a sheet of cellular polystyrene having a thickness in the range of $1/16$–1 inch and a density in the range of 0.4–1 pound per cubic foot. Sufficient heat is applied through the facing sheet to melt a thin layer of the surface of the cellular polystyrene sheet adjacent the facing sheet. The molten polystyrene penetrates into the spaces between the fibers of the facing sheet. Subsequent cooling thereby causes the facing sheet to adhere to the cellular polystyrene sheet when the melted polystyrene surface has solidified. Subsequently, the resulting cooled laminate is passed through two pairs of embossed rolls. One set of the embossed rolls is adapted to imprint the laminate in the cross-machine direction, and the other set is adapted to imprint the laminate in the machine direction. Both sets of embossed rolls are adapted to imprint creases in the laminate, the creases during imprinting having a depth in the range of 50–90% of the thickness of the laminate. After recovery, the creases will have a depth of 10–50% of the laminate thickness, depending on the depth of imprinting.

The sheet of cellular polystyrene which forms the base of the laminate of the present invention must have the unusually low density of 0.4–1 pound per cubic foot. Such low densities are difficult to produce in a commercial production line. However, the process of U.S. 3,058,162, Grabowski, issued October 16, 1962, may be used to produce such low density cellular polystyrene. Sheets may be cut or sliced from blocks produced according to this process. Alternatively, large cylinders of the very low density may be produced by the process described in the patent or a suitable modification thereof, and sheets suitable for making the wrapping material of the present invention may be peeled from these cylinders by means well known in the art. Sheets produced by peeling will have the advantage of possessing a long length. These sheets may be rolled up and used in the process of the present invention directly from such rolls. The thickness of the sheets will vary in the range of $1/16$–1 inch; thicknesses outside of this range are no longer practical for use in a cushioning and wrapping material.

Densities outside the range given above are unsuitable. Lower densities than the stated minimum produce products which are too crushable, open, and weak to be usable, while densities above the maximum produce products which are too stiff and breakable.

The facing sheet to be laminated to the cellular polystyrene sheet should be flexible, open, and fibrous. The purpose of the facing sheet is to impart sufficient strength to the cellular polystyrene sheet that the resulting laminate may be flexed, bent, tightly rolled, and otherwise used as a wrapping material without breaking. The polystyrene sheet alone is too weak to withstand such treatment. The facing sheet will be a light cloth or, preferably, a creped paper having a crepe of 1–10%. Where paper is used, the bursting strength should exceed 3 pounds per square inch in order for the final laminate to have the requisite resistance to breaking when the laminate is bent around small objects. A creped paper should be used. A non-creped tissue having a basis weight less than about 30 pounds per 3,000 square feet cannot be imprinted satisfactorily by the process to be described. When a crepe is imparted to the paper, a reduced basis weight down to about 15 pounds may be used. Many papers have a comparatively heavy weight but are still not strong enough to be used as a facing sheet in the present invention due to the fact that the bursting strength defined above is not sufficiently high. The use of scrap paper pulp in papers generally weakens its strength and is not desirable. The percent reducible sulphur content of the paper to be used as a facing sheet should also be extremely low in order that the final wrapping laminate will not tarnish certain goods such as those made of sterling silver. It is preferred that the paper meet the United States Government tests for non-tarnish tissue as set forth in paragraphs 3.4–3.5, MIL-P-17667A.

In forming the laminate, the facing sheet will generally have a width about equal to that of the cellular polystyrene sheet. Each of the two sheets may be taken off its own roll and fed to a pressing device in which the laminate is formed. The pressing device may be flat-bed press platens or laminating rolls. Laminating rolls are preferred since the process is then continuous. As the two sheets are fed to the nip of the two-roll calender roll, heat is applied to the surface of the polystyrene sheet through the facing sheet alone, not to the back of the polystyrene sheet. The temperature of the heated roll must be sufficiently high to cause incipient fusion of the surface of the cellular polystyrene sheet. This temperature will generally be in the range of 200–350° F., higher temperatures being used at higher rates of feed of the two sheets into the nip of the laminating rolls. Sufficient pressure must be applied by the two rolls to press the facing sheet into the cellular polystyrene sheet in order to form a laminate. Generally speaking, these pressures will be in the range of 5–100 pounds per lineal inch of the working roll width. As a general rule, it is advisable that the opening of the nip between the laminating rolls or the opening between press platens be approximately three-fourths that of the cellular polystyrene sheet being laminated to the facing sheet. The heat and pressure will generally cause a small thickness reduction in the cellular polystyrene sheet. The reduction will range generally from 0–10%, depending on the exact temperature and pressure employed. The heat supplied through the facing sheet brings about a fusion of the surface only of the cellular polystyrene sheet; fusion will not extend below about 1/32 inch into the cellular polystyrene sheet. The melted polystyrene flows into the pores and openings of the facing sheet. As the laminate passes beyond the source of heat, the melted polystyrene immediately cools and solidifies, thus firmly and permanently affixing the facing sheet to the cellular polystyrene sheet. No heat whatsoever is applied to the back of the cellular polystyrene sheet, the area opposite that carrying the facing sheet. Since an exceedingly small amount of the cellular polystyrene is melted, no specific cooling need be applied to permanently affix the facing sheet to the cellular polystyrene sheet to form the finished laminate. A few seconds of time for a laminate being fed to calender rolls at a rate of 20–100 feet per minute is all that is necessary to allow the melted polystyrene to cool and thus to adhere the facing sheet to the cellular polystyrene sheet.

Investigation has shown that the use of adhesives or solvents to adhere the facing sheet to a cellular polystyrene sheet is unsatisfactory. Not only are there process difficulties in using adhesives and solvents on such light materials as the facing sheet and the cellular polystyrene sheet, but distortion of both sheets occurs particularly with penetration of the solvents or adhesives through the porous and open facing sheet needed to supply the necessary strength to the product.

The color of the facing sheet may be chosen for decorative purposes if desired. Thus the color may be white or a solid chromatic color, or the facing sheet may bear colored patterns or designs as desired.

The laminate may then be passed immediately to the imprinting step of the process of the present invention, or it may be rolled and stored and subsequently passed to the imprinting step, whichever is convenient or desirable.

The laminate then passes to two pairs of embossed rolls. It is the rolls themselves that are embossed, they are not embossing rolls. The function of these rolls is to imprint the laminate without leaving much of a mark on the laminate. One pair of the embossed rolls is adapted to imprint lines or creases in the laminate in the cross-machine direction, while the other pair of embossed rolls is adapted to imprint lines or creases in the machine direction. The lines or creases are continuous, those in the cross-machine direction reach from one edge of the laminate to the other, while those in the machine direction run down the entire length of the laminate sheet as it passes through the imprinting rolls. The imprinting rolls will be matched rolls in that the top and bottom are the same. The lands on the rolls will be adapted to imprint into the laminate a depth of 50–90% of the thickness of the laminate. It is this imprinting or pinching or squeezing of the laminate both in the cross-machine and machine directions which gives it its great flexibility when folded or bent in a direction away from the facing sheet. The lands of the two sets of embossed rolls will be in the range of from about 1/8 inch to about 3/4 inch apart in all directions in order to impress the sheet with a pattern of squares having corresponding dimensions.

This imprinting step, carried out in both directions, is critical to impart the desired flexibility to the cushioning and wrapping laminate of the present invention. Without it, the laminate will be appreciably stiffer and may simply break when bent. It must also be emphasized that the multidirectional flexing of the imprinted laminate of the present invention holds true only in a direction away from the facing sheet. Attempts to bend or flex the finished laminate back in the direction of the facing sheet—concave, with the facing sheet inside—cause immediate breaking. Use of a facing sheet on both sides of the cellular polystyrene sheet will also produce a relatively rigid sheet which normally breaks when flexed either way. It is only the unexpected combination described above which produces the cushioning and wrapping laminate having such excellent cushioning properties while nevertheless possessing excellent flexibility in one direction.

The process of the present invention may be better understood with reference to the drawing in which:

FIG. 1 is a simplified diagrammatic representation of the process of the present invention, FIG. 2 shows the embossed rolls adapted to imprint in a cross-machine direction, FIG. 3 shows an embossed roll adapted to imprint in a machine direction, and FIG. 4 is a simplified representation of the cushioning and wrapping laminate of the present invention.

Referring to FIG. 1, the facing sheet roll 1 feeds the facing sheet 2 into the nip 3 of the laminating rolls 4 and 5 simultaneously with the feed of the cellular polystyrene sheet 6. Laminating roll 4 is heated while laminating roll 5 is neither heated nor cooled. Ambient conditions on roll 5 suffice. The laminate 7 passes to the first pair of imprinting rolls 8 which in this instance are adapted to imprint the laminate 7 in the machine direction. Leaving the imprinting rolls 8, the laminate passes to the pair of imprinting rolls 9 which in this instance are adapted to imprint the laminate 7 in a cross-machine direction. The cushioning and wrapping laminate 10 in extremely flexible form in a multi-direction away from the side of the laminated facing sheet 11 may then be cut to shape, rolled, or otherwise used as desired.

FIG. 2 shows the lands 12 on the set of embossing rolls 8. FIG. 3 shows the lands 13 on one of the rolls 9 adapted to imprint in the machine direction; with these rolls it is preferred that the lands on the upper roll oppose lands on the lower roll, instead of opposing the valleys.

FIG. 4 shows the facing sheet 2 laminated to the cellular polystyrene sheet 6 and being firmly affixed thereto at the joint 14 where the melted polystyrene has flowed into the pores and among the fibers of the paper and caused firm adherence. The imprinting marks 15 show in the final product. The imprinting marks 15, however, are not very noticeable due to the great resiliency of the cellular polystyrene sheet 6 and the recovery of such sheet subsequent to the imprinting operation.

The finished laminate may be trimmed to size as desired using rotary trimming blades rotating at sufficiently high speed, for example, about 5,000 linear feet per minute. The following example illustrates an embodiment of the invention.

*Example*

The facing sheet used was a 19 pound basis weight tissue having a 5% crepe and composed of essentially all virgin pulp. The paper is identified as 19 pound Burrows Tissue, United Twine and Paper Company.

The cellular polystyrene sheet was peeled from a cylinder and had a nominal density of 0.5 pound per cubic foot, the actual density varying from 0.5 to 0.6 pound per cubic foot throughout the sheet. The sheet measured 1/4 inch in thickness and had a sheet width varying from 17.5 to 18.5 inches.

The laminating roll assembly used as a Thropp Mill consisting of two rolls mounted horizontally. Both rolls had a speed of 37 feet per minute, the roll in contact with the facing sheet paper being maintained at a temperature of 345° F., plus or minus 5° F. The other roll was neither heated nor cooled. The nip opening between the rolls was maintained at 0.180 inch. The paper facing sheet and the cellular polystyrene sheet were fed into the nip of the rolls simultaneously, the facing sheet being between the cellular polystyrene sheet and the heated roll. The laminate was rolled up as it came out of the laminating roll nip and transferred to the location of the imprinting rolls.

The laminate was passed through the nip of the machine direction imprinting rolls first, and then immediately afterwards into the nip of the cross-machine direction imprinting rolls. Both sets of rolls were run at a speed of 50 feet per minute, no heat or cooling being applied. The nip opening for the machine direction imprinting roll was such that the lands (the teeth) of the two rolls opposed each other, the distance between the tips of the opposing teeth being 0.005 inch. With the cross-machine direction imprinting rolls, the teeth were meshed, the distance between the tip of a tooth on one roll and the bottom of the tooth on the other roll being 0.080 inch.

The resulting laminate was flexible in all directions away from the facing sheet. The cushion and wrapping laminate was sufficiently flexible to be bent around a cylindrical core of ¼ inch diameter, without breaking. On the other hand, when bent backwards, concave in the direction of the facing sheet, the laminate readily broke.

A second run was made to determine the effect of a second facing sheet on the polystyrene sheet in which the cellular polystyrene sheet formed the central core of a laminate sandwich. The same creped facing sheet paper and the same cellular polystyrene sheets were used. The calendar used to laminate the two facing sheets to the polystyrene sheet was a Farrell-Burmingham calender with 30 inch diameter by 24 inch long rolls mounted at a 30° offset angle from the vertical. Both rolls were heated to 320° F., plus or minus 5° F. The speed of each roll was 48 feet per minute, and the nip opening was 0.200 inch. The two sheets of paper and the cellular polystyrene sheet were fed into the nip of the rolls to form a three-layered laminate with the polystyrene foam sheet sandwiched between single layers of the tissue. The resulting laminate was rigid and was cut into 10 foot sheet lengths.

These rigid sheets were transferred to the imprinting roll location and passed through the imprinting rolls described above at a speed of 50 feet per minute. The final product could not be bent around a ¼ inch core without breaking, in either direction. In fact, when the sheet was bent to form a circle having a diameter of about ½ inch, it broke. Thus this sheet would be classed as semirigid as compared with the previously described sheet.

We claim:

1. A flexible cushioning and wrapping laminate consisting of a facing sheet having a thickness in the range of 0.003–0.015 inch and a minimum bursting strength of 3 pounds per square inch laminated to a sheet of cellular polystyrene having a thickness in the range of 1/16–1 inch and a density in the range of 0.4–1 pound per cubic foot, said facing sheet being adhered to said cellular polystyrene sheet by means of polystyrene interspersed among the fibers of said facing sheet and being continuous with the polystyrene in said cellular polystyrene sheet, the laminate having creases in the body thereof in both the machine direction and the cross-machine direction of the sheet, and being capable of being bent and rolled in a direction away from said facing sheet.

2. A laminate according to claim 1 wherein said cellular polystyrene sheet is ¼ inch in thickness.

3. A cushioning and wrapping laminate according to claim 1 in which said facing sheet has a basis weight of 19 pounds per 3,000 square feet.

4. A cushioning and wrapping laminate according to claim 1 wherein said cellular polystyrene sheet has a density of about 0.5 pound per cubic foot.

References Cited by the Examiner

UNITED STATES PATENTS

| | | | |
|---|---|---|---|
| 286,287 | 10/1883 | Fisher et al. | 156—592 |
| 1,748,389 | 2/1930 | Marcel | 156—585 |
| 2,169,505 | 8/1939 | Sherman | 156—592 XR |
| 2,537,126 | 1/1951 | Francis | 156—306 XR |
| 2,652,878 | 9/1953 | Gerard | 156—209 |
| 2,770,406 | 11/1956 | Lane | 161—161 X |
| 2,797,731 | 7/1957 | Carlson | 161—160 X |
| 3,016,317 | 1/1962 | Brunner | 156—219 |
| 3,042,562 | 7/1962 | Peterson | 161—138 |
| 3,058,162 | 10/1962 | Grabowski | 264—53 |
| 3,062,698 | 11/1962 | Aykanian | 156—306 |

EARL M. BERGERT, *Primary Examiner.*

T. R. SAVOIE, J. J. BURNS, *Assistant Examiners.*